United States Patent
Campbell et al.

(10) Patent No.: US 6,278,713 B1
(45) Date of Patent: *Aug. 21, 2001

(54) METHOD AND APPARATUS FOR DISTRIBUTED QUEUE DIGITAL DATA TRANSMISSION EMPLOYING VARIABLE LENGTH DATA SLOTS

(75) Inventors: Graham M. Campbell, Batavia; Chien-Ting Wu, Chicago, both of IL (US)

(73) Assignee: Illinois Institute of Technology, Chicago, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/835,303

(22) Filed: Apr. 7, 1997

Related U.S. Application Data

(63) Continuation of application No. 08/729,541, filed on Oct. 11, 1996, which is a continuation of application No. 08/426,806, filed on Apr. 21, 1995.

(51) Int. Cl.[7] .......................... H04L 12/56; H04L 12/413; H04J 3/02
(52) U.S. Cl. .......................... 370/417; 370/447; 370/462
(58) Field of Search .................................. 370/430, 442, 370/445, 447, 450, 451, 452, 455, 458, 462, 459, 417, 461, 414, 444, 413

(56) References Cited

U.S. PATENT DOCUMENTS

| | | | |
|---|---|---|---|
| 4,161,786 | * 7/1979 | Hopkins et al. | 364/900 |
| 4,885,742 | * 12/1989 | Yano | 370/85.2 |
| 4,920,533 | * 4/1990 | Dufresne et al. | 370/85.2 |
| 4,980,886 | * 12/1990 | Bernstein | 370/80 |
| 5,012,469 | * 4/1991 | Sardana | 370/95.3 |
| 5,113,392 | * 5/1992 | Takiyasu et al. | 370/85.15 |
| 5,303,234 | * 4/1994 | Kou | 370/85.2 |
| 5,570,355 | * 10/1996 | Dail et al. | 370/60.1 |

OTHER PUBLICATIONS

H. Kaur and G. Campbell, "DQDB—An Access Delay Analysis," INFOCOM '90, IEEE, 1990.*

* cited by examiner

Primary Examiner—Alpus H. Hsu
Assistant Examiner—Duc Ho
(74) Attorney, Agent, or Firm—Pauley Petersen Kinne & Fejer

(57) ABSTRACT

A data transmission and receiving network includes a plurality of nodal apparatus for sending and receiving digital data in variable length data slots. The nodal apparatus includes a storage device for maintaining a conflict resolution queue representative of nodal apparatus sending simultaneous requests for transmission causing a collision during a control minislot. The nodal apparatus also includes a transmission queue stored in the storage device. The transmission queue is indicative of nodal apparatus that have successfully transmitted during a minislot and are thus queued for transmission of data in data slots. The apparatus includes a transmitter for sending a variable length data slot signal comprising digital data in response to the state of the transmission queue. The nodal apparatus also includes a receiver for receiving a variable length data slot signal.

15 Claims, 8 Drawing Sheets

METHOD AND APPARATUS FOR DISTRIBUTED QUEUE DIGITAL DATA TRANSMISSION EMPLOYING VARIABLE LENGTH DATA SLOTS

This application is a continuation of application Ser. No. 08/729,541 filed Oct. 11, 1996 which is a continuation of Ser. No. 08/426,806 filed Apr. 21, 1995.

BACKGROUND OF THE INVENTION

The invention relates, in general, to protocols for transmitting digital data and, in particular, to protocols for short haul digital systems such as local area networks.

It has been known for some time that digital data can be transmitted over serial and broadcast media. A problem continuously faced by the designer of digital data communication equipment is efficient utilization of the transmission and receiving equipment as well as efficient utilization of the medium or channel over which the data is to be transmitted and received. A number of approaches have been developed in the past, most of which suffer from one or more drawbacks. One of the earlier well-known digital data control systems is the Aloha System, originally developed for a packet radio application at the University of Hawaii and put into public use more than twenty years ago. The Aloha System, in its pure form, is based upon a broadcast transmission followed by a listening period for an acknowledge signal from the receiving station. If no acknowledge signal is received, the transmitting station then retransmits randomly until it receives an acknowledgement signal indicating that successful transmission has been achieved. The Aloha System, in its pure form, allows variable length data slots or frames to be transmitted. However, Aloha suffers from the drawback that, on average, its Aloha maximum efficiency is about 18%.

An improvement over the pure Aloha system is slotted Aloha, which fixes the periods for data transmission to a fixed time or a slot time, also known as a data slot. The system uses the same transmission followed by acknowledgement as the pure Aloha but, due to the use of the fixed length data slots, achieves, maximally, up to 36% efficiency in channel utilization. CSMA systems have been developed which are useful for relatively short length systems, where "a", which is the ratio of the signal propagation delay to the time duration between the beginning of frame or slot transmission and the termination of frame or slot transmission, is less than 0.5. In those systems, CSMA is attractive. In order to practice the CSMA protocol, each station sharing a broadcast or other medium "listens" to the medium and does not initiate a transmission unless its response to listening indicates that the channel is currently unoccupied by a transmission from any other station. Such systems, however, do not achieve high throughput, in part because the maximal dimension of the system is dictated by the propagation delay to frame length ratio. This does not provide for efficient channel utilization.

The CSMA/CD system provides an improved and more efficient protocol over that of the CSMA system because the CSMA system, upon hearing a collision occurring, backs off for a period of time determined by an exponential back-off algorithm which is executed in appropriate software or hardware logic.

A significant improvement over the prior systems involves a digital protocol wherein a number of nodes, or stations, may all be connected to a single broadcast medium, whether wired or wireless, or may be connected in a star configuration or other configurations. Each of the stations includes a nodal apparatus which has a storage which may include a memory for storing a conflict resolution queue and a transmission queue. The system is a slotted system in that periodically, and at regular intervals, one or more control minislot signals may be transmitted from a particular station followed by a data transmission mission in a data slot in response to conditions in the conflict resolution queue and in the transmission queue. Such a system achieves significantly improved utilization of the channel capacity, in some cases, approaching 1.00 of the channel capacity.

One of the drawbacks of such a distributed queue random access protocol system, which is disclosed in Xu, Wenxin, "Distributed Queuing Random Access Protocols for a Broadcast Channel," Illinois Institute of Technology, Chicago, Ill., Dec., 1990, and U.S. Pat. No. 5,390,181 lies in the fact that for certain systems, such as local area network systems which not only have bursty transmission, but have transmission wherein the amount of data to be transmitted may vary significantly from time to time. Thus, if the fixed length data slot used in the basic distributed queue random access protocol is employed, there may be some channel inefficiencies which result due to the data slot not being entirely filled by a particular data transmission, thus causing some wastage of channel capacity. Likewise, inefficiency may result because a frame longer than the data slot must be segmented and, of course, associated with its own respective control minislots which effectively add unneeded overhead. What is needed is a system which employs conflict resolution queues and transmission queues in combination with a flexible data slot assignment and control system to enhance further the inherent efficiencies in the distributed queue random access protocol system.

SUMMARY OF THE INVENTION

The present invention relates to nodal apparatus and networks employing multiple distributed queues wherein the efficiency of channel utilization, whether on a broadcast channel, star channel or other types of channels is substantially equivalent to the offered load up to an offered load of one. In the event that the offered load is greater than the channel capacity, the inventive system allows the channel utilization to remain at one independently of offered loads of one or above, less the overhead allocated to the control minislots.

The system which provides sufficient channel utilization is a distributed queue random access protocol (DQRAP) system, wherein multiple nodes each include a memory for storing a conflict resolution queue which includes a counter that is incremented when a collision occurs during any control minislot (CMS). An index or other identification is attached to a particular count when the local station has attempted to transmit during a control minislot and detects a collision signal resulting from that control minislot. A second queue is also kept within the nodal station, which queue contains a counter that is incremented for each collision-free minislot access. An index is attached to particular queue numbers to identify the ordinal numeral, or position in the queue, occupied by the particular local station. Thus, each station maintains a conflict resolution queue with a counter having been marked to identify when the station may seek access to control minislots and a transmission queue indicating when the station may transmit during data slots. It may be appreciated that when there is no minislot collision and the transmission queue counter is zero at a local station, the station may immediately transmit its data during that data slot. Each station is further provided with a system for varying the length of a data slot following the control minislot during a particular frame to accommodate, to some extent, variable length data sets which are to be transmitted over the system. In effect, this provides on-the-fly reallocation of the relative proportion of slot time accorded to control minislots versus data slots, thereby enhancing the overall efficiency of the system. In the event that the transmission queue is equal to zero, the dynamic reallocation enters what may be termed an asynchronous mode, wherein stations essentially transmit without control minislots having been sent. In the event that no data or very little data is being sent, the data slot can be shrunk to as little as the round-trip propagation delay between a station and the head-end. In this system, the propagation delay is selected to be the maximum propagation delay between the most distant station and the head-end. The "shrunken" data slot allows beacon or timing signals to be sent out from a single station, which signals reach the head-end and then are reflected or retransmitted on the receiving lines to all stations other than the head-end station, to provide synchronization for slot times on the network.

The prior distributed queue random access protocol permits a nodal apparatus to immediately transmit data under the condition TQ=RQ=0. When two or more nodal apparatus transmit in the same data slot, the entire data slot is wasted. In the present invention, all nodal apparatus ascertain from the content of the control minislots, i.e., two or more successes or one or more collisions or a combination of a success and a collision that a collision in the data slot is occurring. The last nodal apparatus to successfully transmit a data frame in a data slot is considered to be the active nodal apparatus. The two or more transmitting nodal apparatus immediately halt transmission of data and the active nodal apparatus transmits a slot marker signal.

In the event that a head-end unit, which may be characterized as an active head-end unit, is employed and is connected to two or more nodal apparatus, the asynchronous mode may be entered which allows transmission without control minislot overhead when the transmission queue is effectively zero.

Thus, it may be appreciated that increased efficiencies, particularly for short haul or local area networks where "a" is less than one-half, may be achieved by the use of the pipeline or multiple queues comprising the conflict resolution queue for handling and representation of initial conflicts followed by the transmission queue which allowed pipeline transmission of data slots even while contentions are occurring during control minislots for later data transmissions. The efficiencies which are inherent in DQRAP are further enhanced by being able to variably size the data slots on a frame-by-frame or slot-by-slot basis in response to the data load to be transmitted by a particular local station.

It is a principal object of the present invention to provide a distributed queue random access network having multiple stations for storing contention resolution queues and transmission queues for providing variable data slot lengths.

Other advantages of the present invention will become apparent to one of ordinary skill in the art, upon a perusal of the following specification and claims in light of the accompanying drawings.

DETAILED DESCRIPTION OF THE PREFERRED EMBODIMENT

Figure 1:
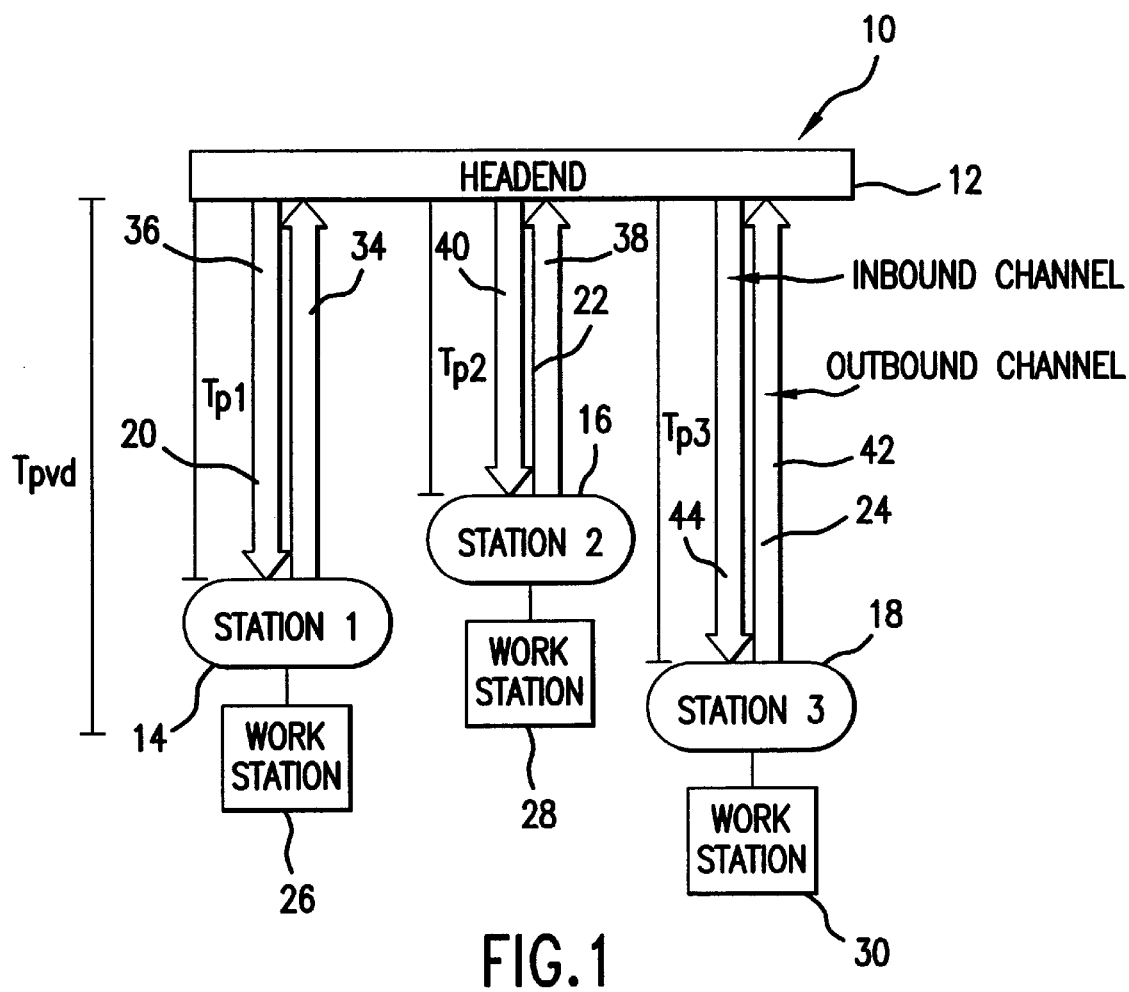
FIG. 1 is a block diagram of a local area network, including multiple stations and a head-end, which network embodies the present invention.
Figure 2:
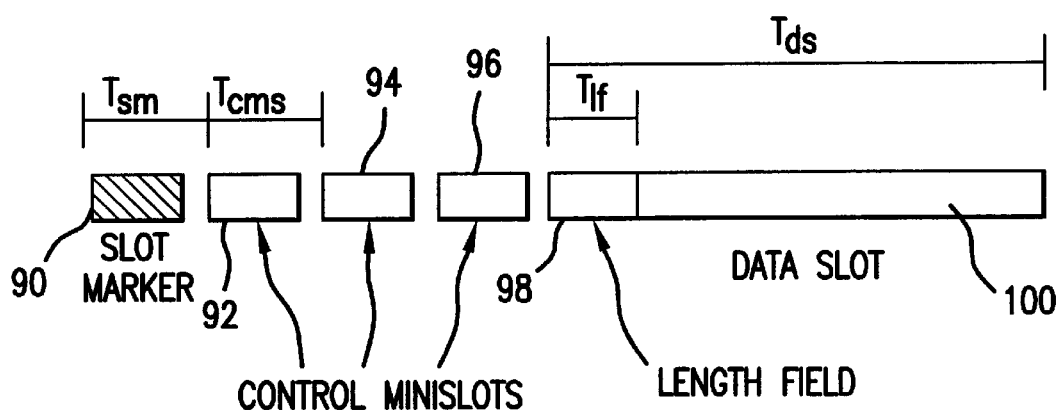
FIG. 2 is a slot diagram identifying the manner in which the slot markers, control minislots, length field and data slot are produced by each of the workstations shown in FIG. 1.
Figure 3:
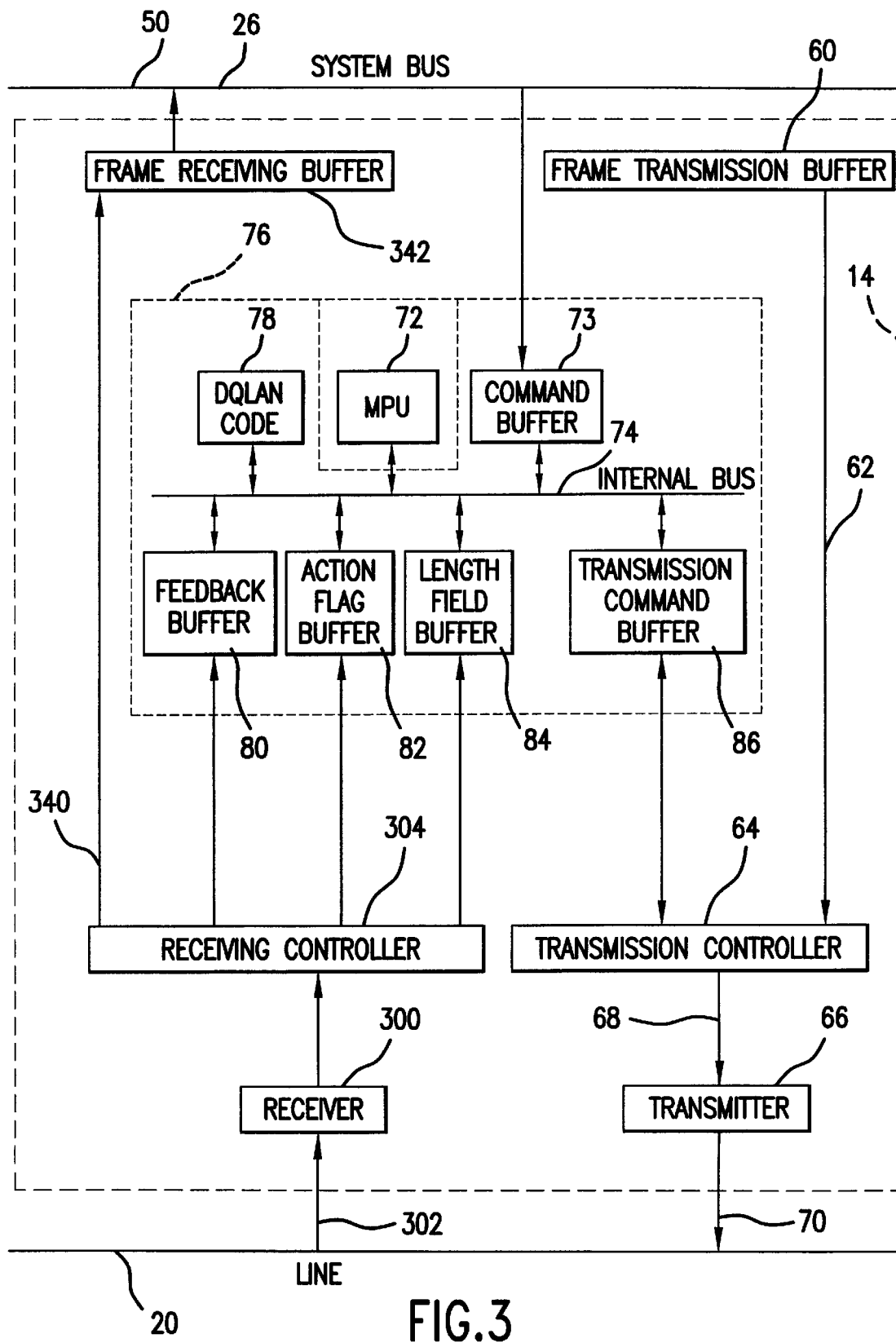
FIG. 3 is a block diagram of nodal apparatus forming part of the stations shown in FIG. 1.
Figure 4:
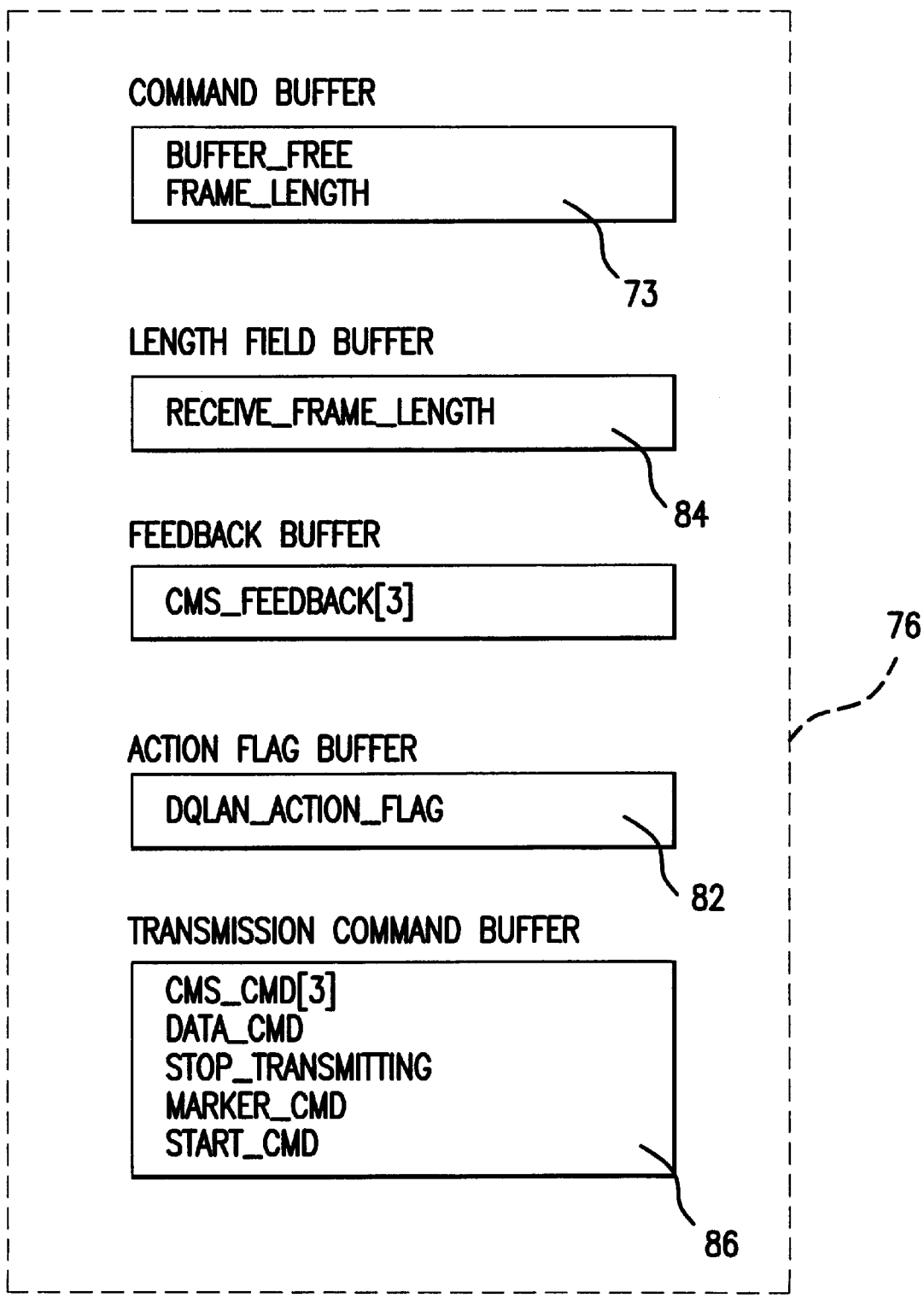
FIG. 4 is a partial memory map describing the buffers defined within the memory of FIG. 3.
Figure 5:
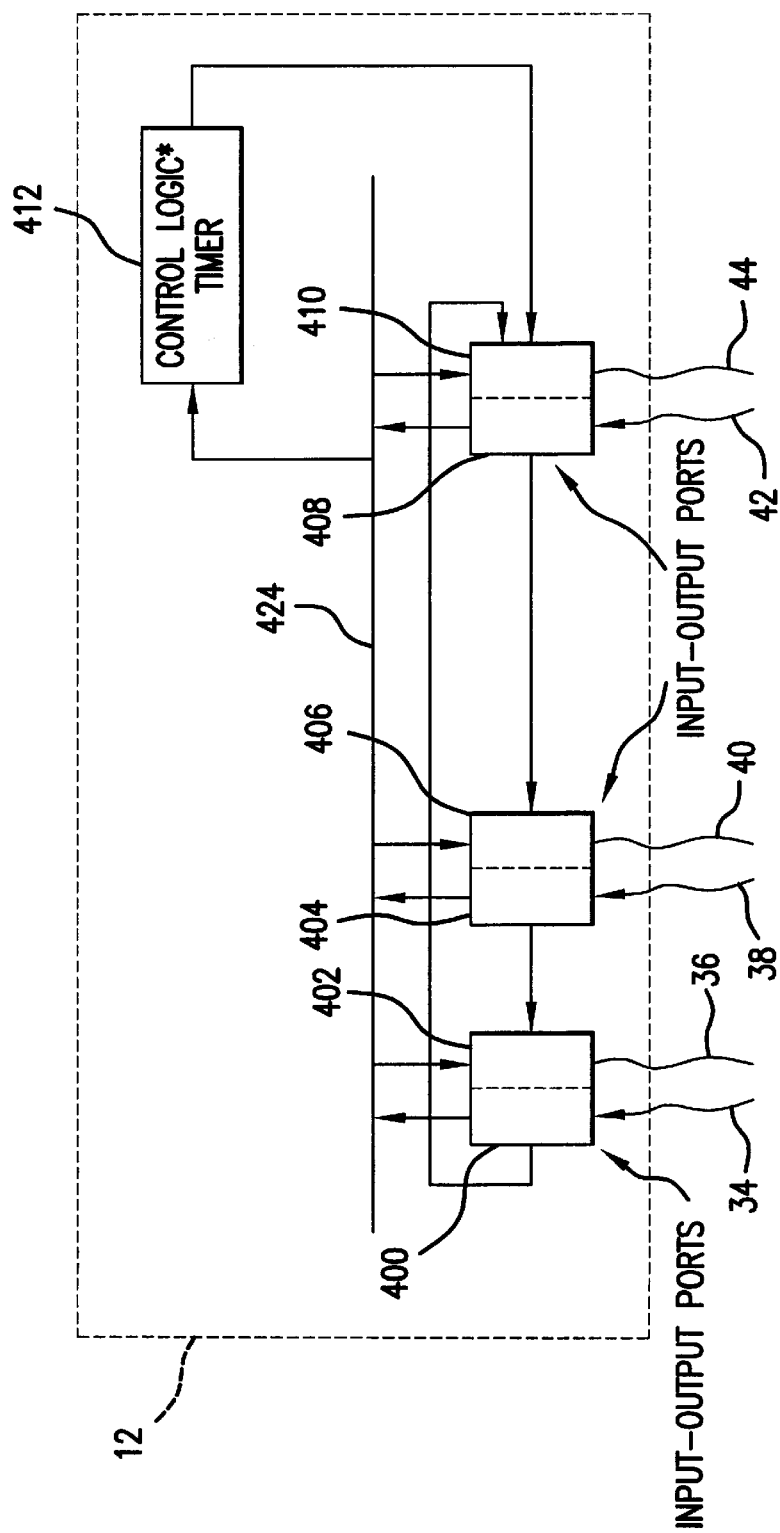
FIG. 5 is a block diagram of a first embodiment of a head-end unit of the type shown in FIG. 1.

Referring now to the drawings, and especially to FIG. 1, a local area network embodying the present invention is shown therein and generally identified by numeral 10. The local area network includes a head-end unit 12 and a plurality of nodal stations or apparatus 14, 16 and 18 connected thereto by respective buses 20, 22 and 24. A workstation, which may be a personal computer, minicomputer, workstation or the like is connected to nodal apparatus 14. Workstation 28 is connected to nodal apparatus 16 and a workstation 30 is connected to nodal apparatus 18. It may be appreciated, as well, that the bus 20 includes an outbound channel 34 and an inbound channel 36. Likewise, bus 22 includes an outbound channel 38 and an inbound channel 40 and bus 24 includes an outbound channel 42 and an inbound channel 44. As may best be seen, each of the nodal apparatus or nodal stations 14, 16 and 18 are substantially identical. Station 14 is shown as may best be seen in FIG. 3. The nodal apparatus 14 is also coupled to a system bus 50 of the workstation or personal computer 26. That system bus may be an ISA, EISA or VESA. The nodal apparatus 14 receives a data in a frame transmission buffer 60. A unit of data is transferred one data slot at a time over a bus 62 to a transmission controller 64 coupled to the bus 62. A transmitter 66 is connected via a bus 68 to the transmission controller 64 and a transmission bus 70 is connected to the combined inbound and outbound bus 20. The transmission controller 64, however, will only transfer a frame of data which it has received from the frame transmission buffer 60 if certain other events occur. A microprocessor (MPU) 72 is connected to an internal bus and data. Instructions for sending and receiving information to other stations via the head-end 12 are stored in the DQLAN code portion of the memory 78 and are regularly fetched by the microprocessor unit 72 and executed as set forth in more detail in the code in following Table I and in the accompanying flow charts. The last nodal apparatus active in successfully transmitting a data frame generates a slot marker at the front end of its slot as is shown in FIG. 2. Three control minislots 92, 94 and 96 follow the slot marker. The slot marker and the control minislots each go out the outbound portion of the bus 34, or if the bus is a single wire, travel away from the nodal apparatus 14 to the head end 12 where the head-end 12 will either passively or actively cause the slot markers and control minislots to be delivered to all outbound channels on the system, e.g., channels 34, 38 and 42. Thus, nodal apparatus 14 will receive its own slot marker and control minislots back as well as nodal apparatus 16 and 18 also receiving the slot marker and control minislots.

Referring in more detail to the operation of the system, execution is started in a step 110 and control is transferred to test for whether a start command flag is set in a step 112. If command is not to be started, step 112 enters a loop. If the start command flag is set, control is transferred to a step 114 that sets the start command flag to zero. Control is then transferred to a step 116 which tests for a marker command flag. If the marker command flag has been set, a slot marker 90 is sent in a step 118. If the marker command flag has not been set, the system waits a period of time equal to the marker transmission time in order to maintain overall synchronization. Control is then transferred to a decision step 122 where an initial control minislot flag is tested for. If it is set to "yes" a first control minislot or request signal is sent in a step 124. If it is not, the system delays for a period equal to a controlled minislot transmission time in a step 126 to maintain synchronization with other portions of the network. In a step 128, a test is made to determine whether the flag is set to send the second controlled minislot. If it has been sent, the controlled minislot is then sent in a step 130. If it is not, the system delays for a period of time equal to a controlled minislot transmission time in a step 132. Control is then transferred to a step 134 where the last of the three controlled minislot flags is tested for. If it has been set, the controlled minislot is sent out in a step 136. If it has not been set, the system waits another period of time equal to a controlled minislot transmission time to maintain synchronization. Control is then transferred to a decision block 140 where the data command flag is tested for. If it has not been set, control is transferred back to the decision block 112. If it has been set, the length field 98, indicative of the length of the data slot, is then sent. It may be appreciated that the length field is set to set the overall length of the data slot in order that if short length data is to be sent, time will be saved on the system. If longer length data is to be sent, the data slot can be expanded, thereby achieving better throughput through the system. After the length field has been sent out, a data byte is sent in the step 144 and a test is made in a step 146 to determine whether the end of data has been reached. If it has, control is then transferred back to decision step 112. If has not been, a test is made to see whether the stop transmitting flag has been set. If it has, control is transferred to the decision step 112. If the stop transmitting flag has not been set, control is transferred back to the step 144 and another byte of data is sent.

Figure 9:
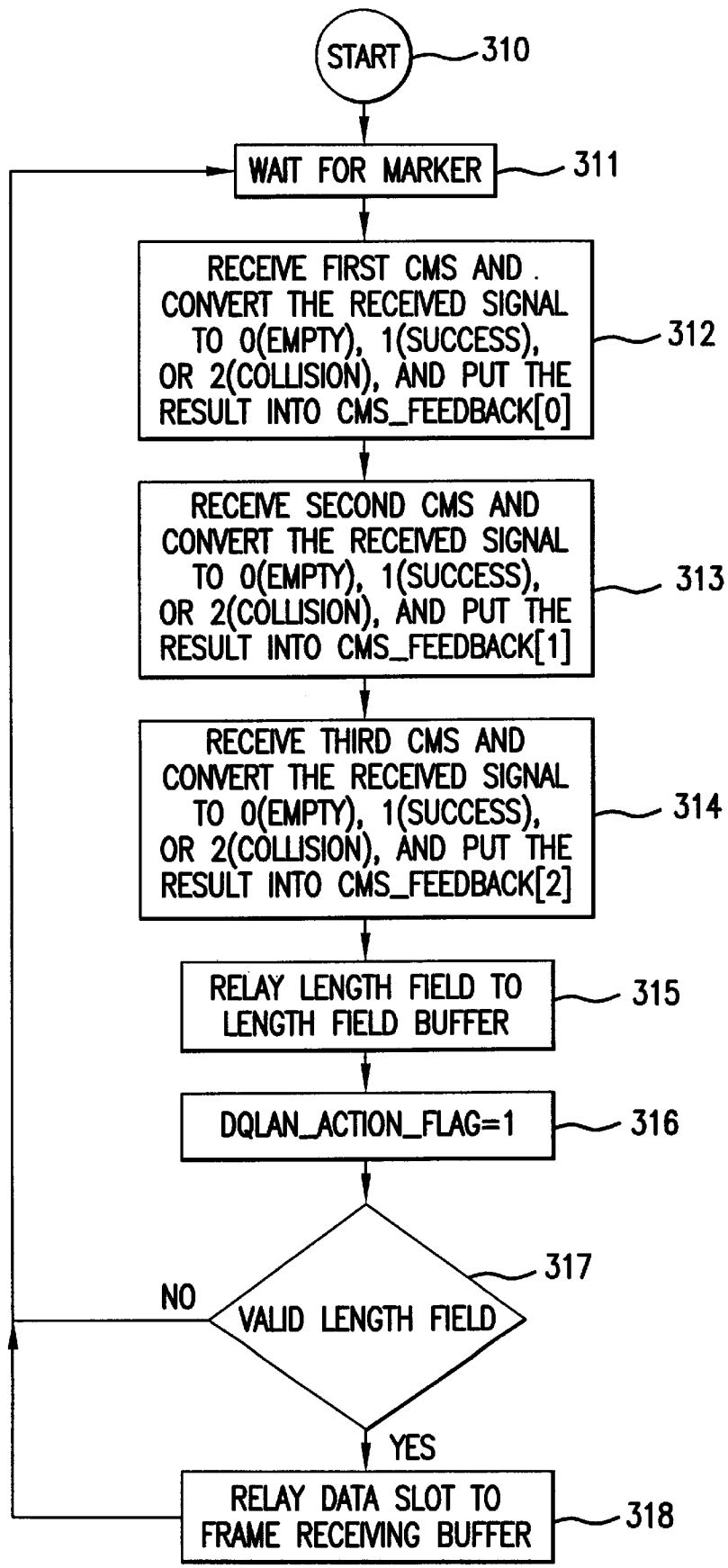
FIG. 9 is a flow chart describing the actions of the synchronizer.
Figure 10:
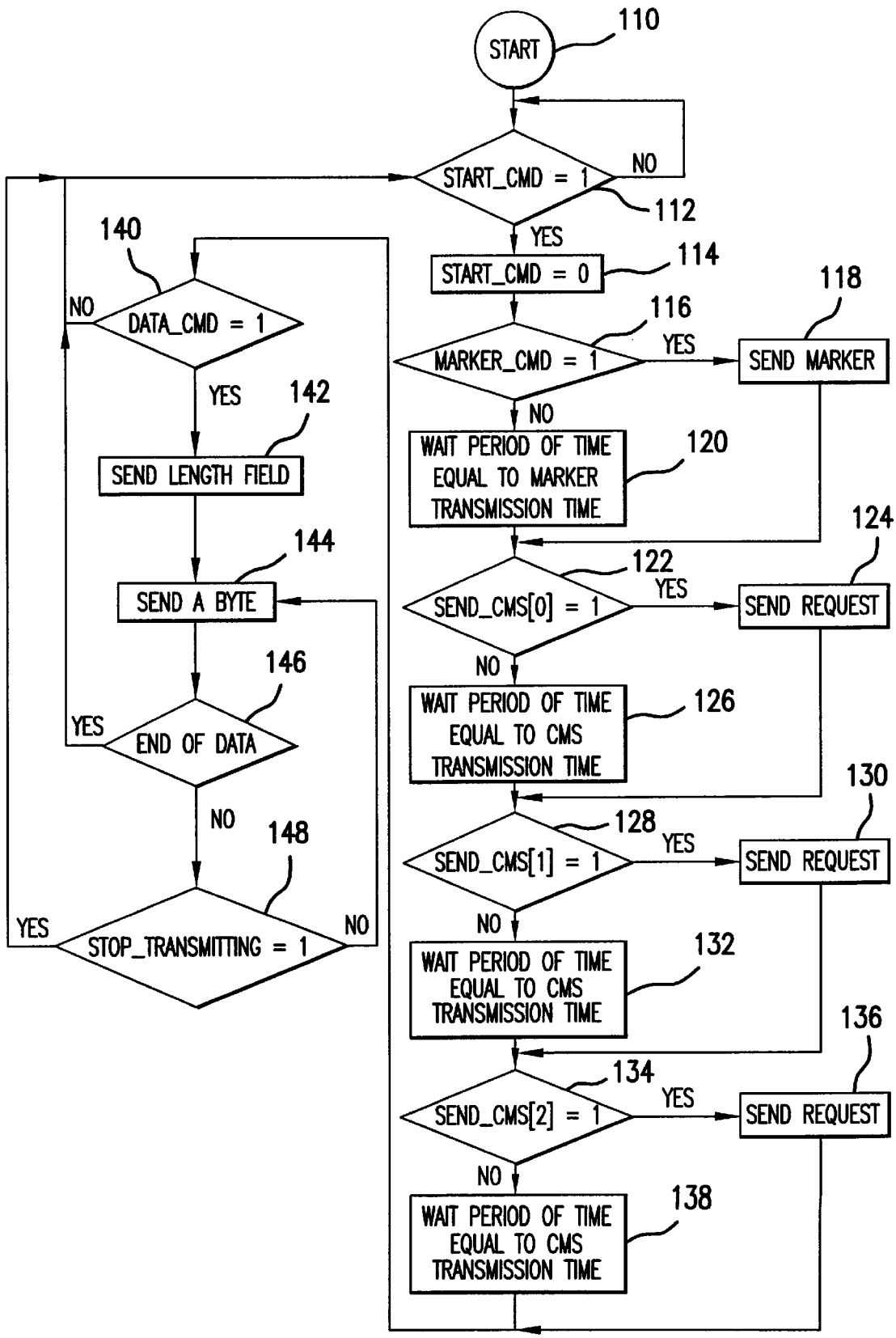
FIG. 10 is a flow chart of the activities taking place when a transmission is to occur from one of the nodal apparatus.

In order to mediate access to the network the receiver 300 is coupled via a bus 302 to the transmission line 20. The transmission line, of course, could be optical fiber, coaxial cable, twisted pair or the like. Signals are then fed from the receiver 300 to the receiving controller 304. As may best be seen in FIG. 9, the receiving controller 304 executes a start step 310. In a step 311, it waits to receive the slot marker. Next, in a step 312, the receiving controller receives the first control minislot signal and converts the received signal to 0 standing for empty, 1 standing for successful transmission or 2 standing for collision. The result is then put into a CMS feedback vector at position 0. In a step 313, the second controlled minislot is received and like-wise the signal is converted to 0 for empty, 1 for success or 2 for collision with the resulting signal being put into the number 1 (or second) position of the control minislot feedback vector. In a step 314, the third control minislot is received and likewise loaded. In a step 315, the length field is placed in the length field buffer 84. In a step 316, the DQLAN action flag is set to 1 and in a step 317 a test is made to determine whether the length field is valid. If it is not, control is returned to the step 311. If the length field is valid, the data slot signal is then relayed on a bus 340 to the frame receiving buffer 342 which is connected to the system bus 26 of the local workstation.

In the event that a signal collision has occurred, the collided or mixed signals are simply reflected or transmitted back from the head-end to each of the stations. If the collision detector 320 detects that a collision has occurred, the microprocessor then causes a collision resolution queue stored within the memory 76 to be incremented and, if the station 14 was at least one of the stations which had sent a signal out during one of the previous three control minislots, an index flag is set indicating that for that queue entry, which is awaiting in the contention resolution queue, local station 14 was the one sitting in the queue which should be allowed back in at that slot to re-contend. In the event that previous collisions had been taking place and the frame transmitting buffer has information stored within it waiting to be transmitted, a transmission queue is also kept in the memory 76. If the transmission queue indicates that on the next available data slot local station 14 is to transmit, then local station 14 outputs the data in the data slot. Thus, it may be appreciated that the contention resolution or arbitration for control minislots at the head of a slot are to some extent uncoupled from the immediately following data slot to allow higher efficiency usage of the medium upon which the signals are being sent.

The manner in which this is done is set forth in further detail in the code written in the C programming language in the following Table I.

TABLE I

```
int Tpvd;       /* Propagation delay for virtual distance           */
int T;          /* Propagation delay between the headend and the    */
                   stn
int bit_time;   /* One bit transmission time                        */
int ds_time;    /* data slot transmission time                      */
int delay_time; /* Action delay time                                */
int tq;         /* Binary counter of the transmission queue         */
int rq;         /* Binary counter of the resolution queue           */
int tq_index;   /* Position in transmission queue                   */
int rq_index;   /* Position in resolution queue                     */
main()
{
    Initialization();
    while (1) {
        while (DQLAN_action_flag = = 0);
        DQLAN_action_flag = 0;
        DQLAN();
    }
}
Initialization()
{
    delay_time = (Tpvd - T) * 2;
    DQLAN_action_flag = 0;
    tq = 0;
    rq = 0;
    tq_index = 0;
    rq_index = 0;
    buffer_free = 1;
    marker_cmd = 0;
    start_cmd = 0;
}
DQLAN()
{
    DQLAN_QDR ()
    DQLAN_RTR();
    DQLAN_DTR();
    wait (delay_time);
    stop_transmitting = 0;
    start_cmd = 1;
}
DQLAN_QDR()
{
```

TABLE I-continued

```
        int n_request, i;
        n_request = cms_feedback[0] + cms_feedback[1] +
        cms_feedback [2];
        if (tq = = 0 && n_request ! = 1) {
                stop_transmitting = 1
                delay_time = 2 * (Tpvd - T);
        }
        else {
                ds_time = receive_frame_length * 8 * bit_time;
                if (ds_time < 2 * (Tpvd - T))
                        ds_time = 2 * (Tpvd - T);
                delay_time = ds_time - 2 * (Tpvd - T);
        }
        if (tq > 0) {
                tq = tq - 1;
                if (tq_index > 0) {
                        if (tq_index + + 1)
                                buffer_free = 1)
                        tq_index - -;
                }
        }
        if (rq > 0) {
                rq = rq - 1;
                if (rq_index > 0)
                        rq_index - -;
        }
        for(i = 0; i < 3; i + +) {
                if (cms_feedback[i] = = 1) {
                        if (tq = = 0 && n_request = = 1) {      /*
Immediate access                                                 */
                                if (data_cmd = = 1) {
                                        buffer_free = 1
                                        marker_cmd = 1
                                }
                                else
                                        marker_cmd = 0;
                        }
                        else {
                                tq = tq + 1;
                                if (cms_cmd[i] = = 1)
                                        tq_index = tq;
                        }
                }
                else if (cms_feedback[i] = = 2) {
                        rq = rq + 1;
                        if (cms_cmd[i] = = 1)
                                rq_index = rq;
                }
        }
}
DQLAN_RTR()
{
        cms_cmd[0] = 0;
        cms_cmd[1] = 0;
        cms_cmd[2] = 0;
        if (rq > 0) {
                if (rq_index > 0) {
                        if (rq_index = = 1)
                                DQLAN_RTR_CMS();
                        rq_index - -;
                }
        }
        else if (buffer_free = = 0 && tq_index = =
        0 && rq_index = = 0)
                DQLAN_RTR_CMS();
}
DQLAN_RTR_CMS()
{
        int i;
        select a number i between 0 and 2 randomly
        cms_cmd[i] = 1;
}
DQLAN_DTR()
{
        data_cmd = 0;
        if (tq > 0) {
                if (tq_index = = 1) {
                        data_cmd = 1;
                        marker_cmd = 1;
```

TABLE I-continued

```
                }
                else
                        marker_cmd = 0;
        }
        else if (rq = = 0) {
                if (buffer_free = = 0 && tq_index = =
                0 && rq_index = = 0)
                        data_cmd = 1;
        }
```

Figure 6:
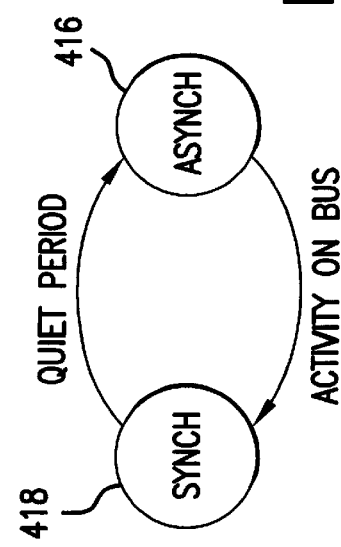
FIG. 6 is a state machine diagram describing activity taking place in the head-end unit shown in FIG. 5.
Figure 7:
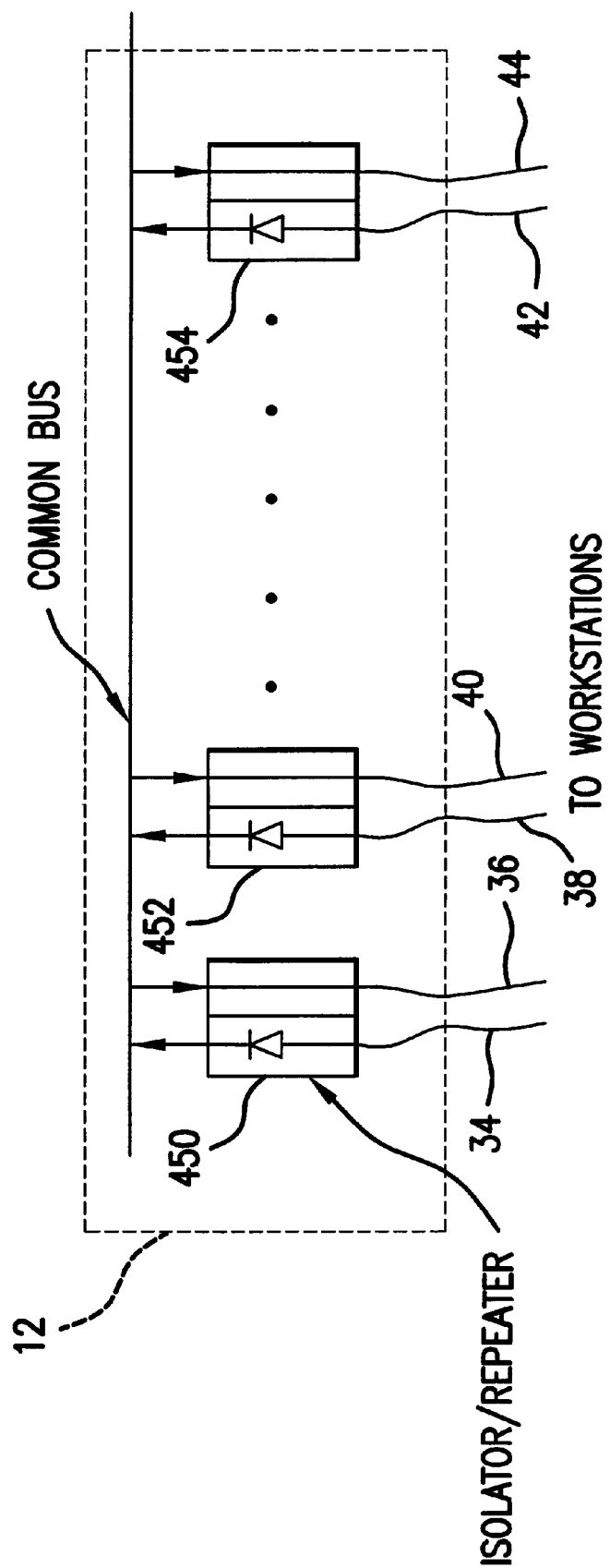
FIG. 7 is a block diagram of a second head-end unit.
Figure 8:
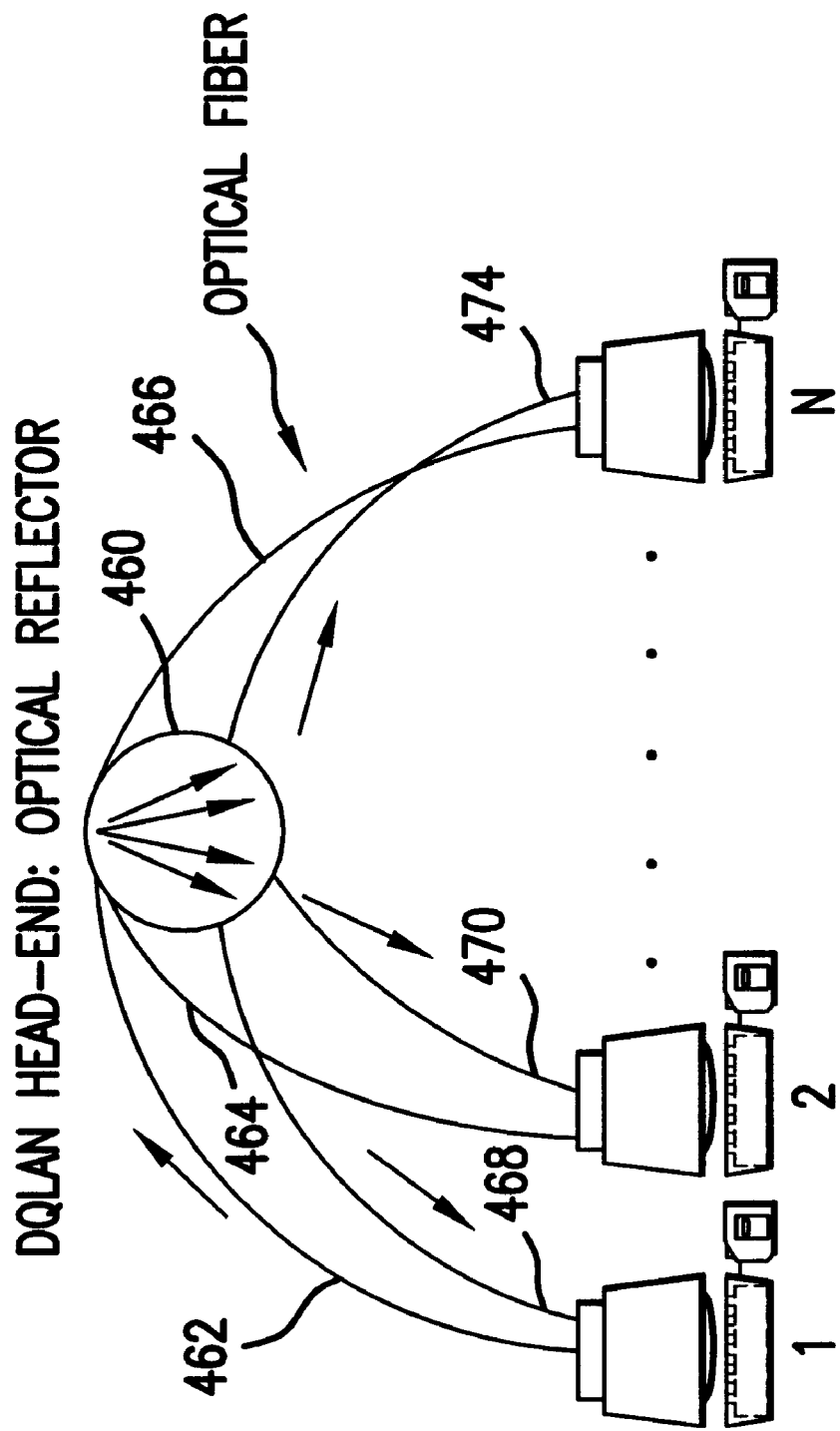
FIG. 8 is a block diagram of a third version of the head-end unit.

It can also be appreciated that further advantages may be achieved by the system due to the ability to vary the length of the data slot depending upon the amount of data to be sent out which avoids having partially empty data slots sent out consuming extra time on the LAN transmission medium. The head-end 12 may, in a first embodiment, be an intelligent head-end 12 including multiple input/output ports 400, 402; 404, 406; and 408, 410, all operating under the control of a control logic timer 412. After a quiet period, the head-end may switch to an asynchronous mode in a state 416 as shown in FIG. 6, which will allow data slots to simply be sent. If there is activity on the bus indicative of data arriving, detected by the control logic timer 412, the head-end switches back to the synchronous mode 418 causing timing signals to be sent out on the bus, wherein the full control minislot, data slot combinations are transmitted and received. It may be appreciated that any signal received on any of the inputs 400, 404 and 408 will be sent to an input signal bus 424 and received by all of the output ports 402, 406 and 410 and returned to their particular stations. A somewhat simpler way of doing this is shown in a passive electrical head end set forth in FIG. 7. The head-end simply has a common bus to which a plurality of isolator repeaters 450, 452 and 454 are connected such that when any signal is received on an inboard line, it is immediately sent back on all of the outgoing buses.

Finally, if an optical system is used, such as an optical fiber, the optical fibers are all joined together into an optical multiplexing head 460 and any signal received on an inbound bus 462, 464 and 466 will be sent out on all of the outbound buses 468, 470 and 474.

While there has been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed and desired to be secured by Letters Patent of the United States is:

1. A nodal apparatus for sending and receiving digital data in a variable length data slot, comprising:
   a station for maintaining a conflict resolution queue for handling and representation of initial conflicts and representative of nodal apparatus sending substantially simultaneous requests for transmission resulting in a collision in a control minislot;
   means for maintaining a transmission queue for allowing transmission of variable length data slots while collisions are occurring and representative of nodal apparatus that have successfully transmitted digital data in a control minislot and can be queued for variable length data slot transmission;
   a transmission controller for sending a variable length data slot signal comprising digital data in response to the transmission queue; and a receiving controller for receiving a variable length data slot signal comprising digital data.

2. A nodal apparatus according to claim 1, further comprising means for receiving a control minislot, wherein said means for receiving a control minislot produce a minislot signal to which said means for maintaining the conflict resolution queue and said means for maintaining the transmission queue are responsive.

3. A data transmission network comprising:

a nodal apparatus for sending and receiving digital data in a variable length data slot, comprising:

a station for maintaining a conflict resolution queue for handling and representation of initial conflicts and representative of nodal apparatus sending substantially simultaneous requests for transmission resulting in a collision in a control minislot;

means for maintaining a transmission queue for allowing transmission of variable length data slots while collisions are occurring and representative of nodal apparatus that have successfully transmitted digital data in a control minislot and can be queued for data slot transmission;

a transmission controller for sending a variable length data slot signal comprising digital data in response to the transmission queue;

a receiving controller for receiving a variable length data slot signal comprising digital data; and a head-end apparatus for receiving control minislot signals and data slots from said nodal apparatus, said head-end apparatus comprising means for receiving a control minislot and means for transmitting a signal to multiple nodal apparatus indicative of whether two or more nodal apparatus are asserting a request for access to a data slot.

4. A data transmission network according to claim 3, wherein said head-end apparatus comprises a passive network for transmitting said control minislot signal to additional nodal apparatus.

5. A data transmission network according to claim 3, wherein said head-end apparatus comprises parallel port means for simultaneous receipt of control minislot signals from multiple nodal apparatus;

means for detecting whether a transmission during a transmission slot comprises an initial data slot signal or an initial control minislot signal;

means for arbitrating a conflict between data slot signals arriving substantially simultaneously during a single transmission slot, said arbitration means causing a first received data slot signal to be forwarded to at least one receiving nodal apparatus, wherein a second transmitting nodal station detects the first transmitted data slot signal and, in response thereto, delays further transmission until a successive slot when it transmits a control minislot signal for receipt by the head-end apparatus followed immediately by the data from the second transmitted data slot.

6. A nodal apparatus for transmitting and receiving data slot signals representative of digital data, comprising:

a memory containing a conflict resolution queue for handling and representation of initial conflicts and a transmission queue for allowing transmission of variable length data slots while collisions are occurring;

a data slot transmitter responsive to signals received from said memory representative of a current state of the conflict resolution queue and the transmission queue and generating a data length signal and a data signal; and a data slot receiver for receiving the data length signal and the data slot signal representative of digital data from at least one of the nodal apparatus and at least one other nodal apparatus.

7. A method of sending and receiving digital data in a variable length slot in a nodal network, comprising:

a station maintaining a conflict resolution queue for handling and representation of initial conflicts and representative of nodal apparatus sending substantially simultaneous requests for transmission resulting in a collision in a control minislot;

transmitting in a control minislot a request for transmission and a unique pattern for identifying the nodal apparatus and for resolving conflicts among nodal apparatus;

maintaining a transmission queue for allowing transmission of variable length data slots while collisions are occurring and representative of nodal apparatus that have successfully transmitted digital data in a control minislot and can be queued for data slot transmission;

sending a variable length data slot signal comprising digital data in response to the transmission queue; and receiving a variable length data slot signal comprising digital data.

8. The method of claim 7 further comprising:

receiving a control minislot;

producing a minislot signal in response to said control minislot; and applying the minislot signal to the conflict resolution quene and the transmission quene.

9. A method of sending and receiving digital data in a variable length slot for a nodal data transmission network, comprising:

maintaining a conflict resolution queue for handling and representation of initial conflicts and representative of nodal stations sending substantially simultaneous requests for transmission resulting in a collision in a control minislot;

transmitting in a control minislot a request for transmission and a unique pattern for identifying the nodal station and for resolving conflicts among nodal stations;

maintaining a transmission queue for allowing transmission of variable length data slots while collisions are occurring and representative of nodal stations that have successfully transmitted digital data in a control minislot and can be queued for data slot transmission;

sending a variable length data slot sional comprising data in response to the transmission queue;

receiving a variable length data slot signal comprising digital data; and receiving control minislot signals and data slots from said nodal stations, comprising the substeps of;

receiving a control minislot from a nodal station; and transmitting a signal to multiple nodal stations indicative of whether two or more nodal stations are asserting a request for access to a data slot.

10. The method of claim 9 wherein said receiving control minislot signals and data slot signals from said nodal stations further comprises:

simultaneously receiving control minislot signals from multiple nodal stations;

detecting whether a transmission during a transmission slot comprises an initial data slot signal or an initial control minislot signal;

arbitrating a conflict between at least first and second data slot signals arriving substantially simultaneously from first and second nodal stations during a single transmission slot;

causing said first received data slot signal to be forwarded to at least one receiving nodal station;

detecting at a second transmitting nodal station of the multiple nodal stations the first transmitted data slot signal; and delaying further transmission at said second transmitting nodal station until a successive slot.

11. A nodal apparatus for sending and receiving digital data in a variable length data slot, comprising:

a transmitter for transmitting in a control minislot a transmission request and a unique pattern for identifying the nodal apparatus and for resolving conflicts among nodal apparatus during a control minislot;

a station for maintaining a conflict resolution queue for handling and representation of initial conflicts and representative of nodal apparatus sending substantially simultaneous requests for transmission resulting in a collision in a control minislot;

a transmission queue for allowing transmission of variable length data slots while collisions are occurring and representative of nodal apparatus that have successfully transmitted digital data in a control minislot and can be queued for data slot transmission;

wherein the transmitter sends a variable length data slot signal comprising digital data in response to the transmission queue; and a receiver for receiving a variable length data slot signal comprising digital data.

12. A nodal apparatus according to claim 11, further comprising a minislot receiver for receiving a control minislot, wherein said minislot receiver produces a minislot transmission quene are responsive.

13. A data transmission network comprising:

a nodal apparatus for sending and receiving digital data in a variable length data slot, comprising:

a transmitter for transmitting in a control minislot a transmission request and a unique pattern for identifying the nodal apparatus and for resolving conflicts among nodal apparatus during a control minislot;

a station for maintaining a conflict resolution queue for handling and representation of initial conflicts and representative of nodal apparatus sending substantially simultaneous requests for transmission resulting in a collision of a control minislot;

a transmission queue for allowing transmission of variable length data slots while collisions are occurring and representative of nodal apparatus that has successfully transmitted digital data in a control minislot and can be queued for data slot transmission, wherein the transmitter sends a variable length data slot signal comprising digital data in response to the transmission queue;

a receiver for receiving a variable length data slot signal comprising digital data; and a head-end apparatus system for receiving control minislot signals and variable length data slots from said nodal apparatus, said head-end apparatus comprising a minislot receiver for receiving a control minislot and a minislot transmitter for transmitting a signal to multiple nodal apparatus indicative of whether two or more nodal apparatus are asserting a request for access to a data slot.

14. A data transmission network according to claim 13, wherein said head-end apparatus comprises a passive network for transmitting said control minislot signal to additional nodal apparatus.

15. A data transmission network according to claim 13, wherein said head-end apparatus comprises a parallel port for simultaneous receipt of control minislot signals from multiple nodal apparatus;

a detector for detecting whether a transmission during a transmission slot comprises an initial data slot signal or an initial control minislot signal;

a controller for arbitrating a conflict between data slot signals arriving substantially simultaneously during a single transmission slot, said controller causing a first received data slot signal to be forwarded to at least one receiving nodal apparatus, wherein a second transmitting nodal apparatus detects the first transmitted data slot signal and, in response thereto, delays further transmission until a successive slot when it transmits a control minislot signal for receipt by the head-end apparatus followed immediately by the data from the second transmitted data slot.

* * * * *